(No Model.)
C. M. SMITH.
TOY ANIMAL FIGURE.
No. 483,727.　　　　　　　　　Patented Oct. 4, 1892.
Fig. 1.
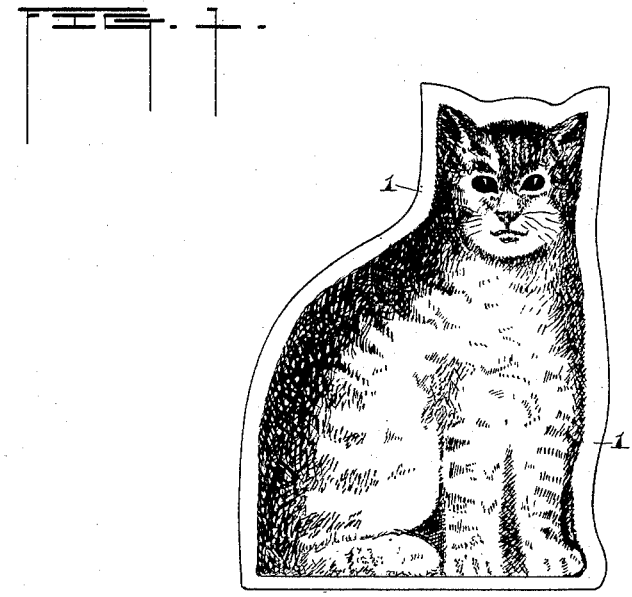
Fig. 3.　　　　　　　　　　　　Fig. 2.
Fig. 4.
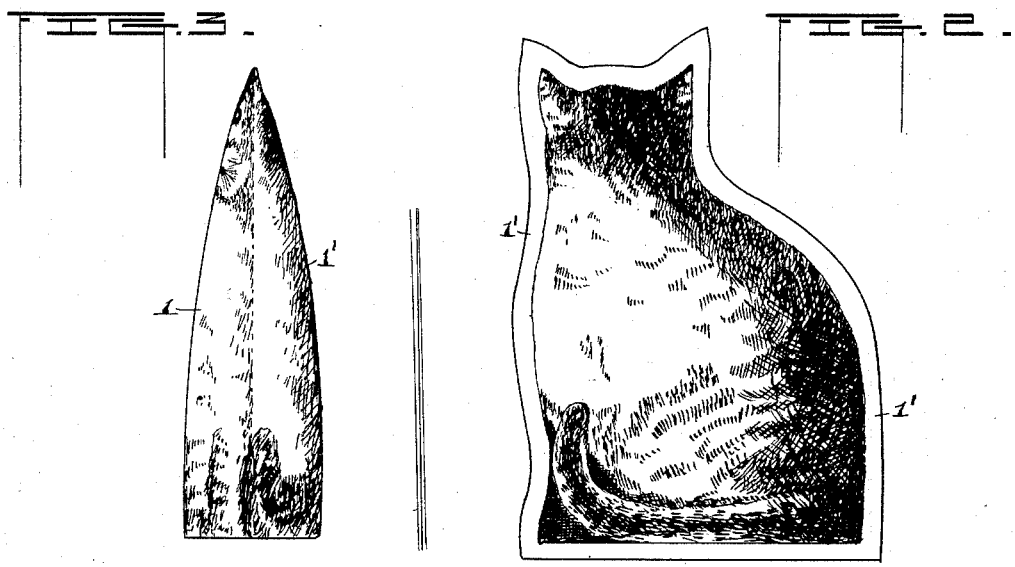
WITNESSES　　　　　　　　　　　　　INVENTOR
　　　　　　　　　　Celia M. Smith
　　　　　　　　　　　　　　　　by
　　　　　　　　　　　　　　　Benj. R. Catlin
　　　　　　　　　　　　　　　　　atty.
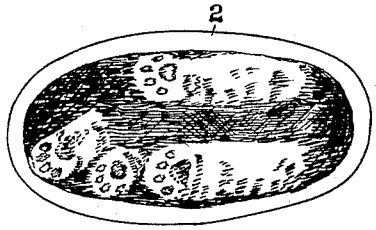
THE NORRIS PETERS CO., PHOTO-LITHO., WASHINGTON, D. C.

UNITED STATES PATENT OFFICE.

CELIA M. SMITH, OF ITHACA, NEW YORK.

TOY ANIMAL FIGURE.

SPECIFICATION forming part of Letters Patent No. 483,727, dated October 4, 1892.

Application filed June 2, 1892. Serial No. 435,249. (No model.)

*To all whom it may concern:*

Be it known that I, CELIA M. SMITH, a citizen of the United States, residing at Ithaca, in the county of Tompkins and State of New York, have invented and produced a new and original Invention in Animal Figures for Toys; and I do hereby declare the following to be a full, clear, and exact description of the same, reference being had to the accompanying drawings, forming a part thereof.

The invention relates to the manufacture of stuffed animal figures, such as used for toys. As heretofore practiced a number of pieces of cloth (eight or more) have been sewed together and stuffed with cotton or other material to represent the animal selected; but the sewing together of these numerous pieces has been attended with difficulty, and it has been impracticable to effect it by machinery, and such imitations of animals have not been formed so as to be stable in any natural position. The limbs become bent and limp and at best are clumsy imitations, useless except as handles, and are quickly and easily torn from the body. The object of my improvement is to simplify and cheapen the construction of such figures and to provide them with a base that affords a stable equilibrium and at the same time renders them more life-like and suitable for the amusement and instruction of children.

The invention consists in the construction hereinafter described and pointed out.

In the accompanying drawings, Figure 1 is a plan of the pattern for the front of an animal. Fig. 2 is a similar view of the back. Fig. 3 is an edge view of the complete figure, and Fig. 4 is a plan of a base-pattern.

According to the improvement a figure representing an animal—such as a cat—in a sitting position is made of three pieces of cloth or other material suitably secured together and stuffed with cotton or the like. Preferably such figure is printed, painted, or penciled to increase its life-likeness, substantially as indicated.

Numeral 1 indicates a front, 1' a back, and 2 a bottom piece. In practice these parts will be cut in quantity out of a suitable material previously printed to represent a series of animals. The side pieces are first sewed together along their upper and side edges. The bottom piece, which is preferably oval and of sufficient size to support the figure when complete in stable manner in an upright position, is then sewed to the lower ends of the side pieces, a suitable filling being introduced before the seam is finally closed. As the base has relatively a large transverse area, the opening subsequently filled by the base-piece is very convenient for the rapid and proper introduction of the filling material, so as to fill the upper part of the figure without distorting the desired outlines corresponding to the pattern. The final filling of the figure near its base requires less care and can be effected after the base-piece has been partially sewed in. The seams, it will be noted, are long and few in number and as straight and continuous as practicable and can be sewed by a machine. In the completed figure they lie in two planes, one passing vertically through the center of the figure from front to rear, the other being in the plane of the base.

In the drawings the situation of the several seams is indicated on the pieces by the outline of the figured part. The plain exterior border or edge shown is turned inwardly when the pieces are sewed together. The lines or colors that may be applied to give a more life-like appearance may be variously disposed. In the case shown the middle pictured or figured line of the back need not coincide with the back-seam. The front feet can be indicated both on the front, as shown in Fig. 1, and on the bottom, as shown in Fig. 4.

Owing to the naturalness of figures made as herein described and to the fact that they can be easily placed in stable and life-like positions, they prove more attractive and useful than figures formed with limbs and without sufficient supporting-base, as heretofore. Figures of animals—such as the cat, dog, rabbit, pig and others that sit upon the haunches—can be thus represented. Others that do not thus sit can also be represented, though the appearance of the imitations may be less natural.

The improvement is well adapted to displace the comparatively-expensive, distorted, and unnatural figures usually dragged about by a limb until they lose their original scanty resemblance to an animal and fail entirely to appeal to or to suggest appropriate perceptions and tastes in the immature minds that it is their object to interest and develop. The purpose is attained in my invention by a very simple and economical construction, which is also very durable.

Having thus described my invention, what I claim, and desire to secure by Letters Patent, is—

1. The animal figure composed of two suitably-shaped pieces of fabric printed or marked in imitation of an animal and secured together at their edges corresponding to the upper, front, and rear outline of the animal, and a base-piece secured to their bottom edges to constitute said base, the receptacle thus formed being stuffed with a filling material, substantially as set forth.

2. The animal figure having a broad and practically-flat base and composed of two suitably-shaped pieces of fabric secured together at their edges corresponding to the upper, front, and rear outline of the animal, and a base-piece secured to their bottom edges to constitute said base, the receptacle thus formed being stuffed with a filling material, substantially as set forth.

In testimony whereof I affix my signature in presence of two witnesses.

CELIA M. SMITH.

Witnesses:
CHARLES H. BLOOD,
WM. HAZLITT SMITH.